Sept. 29, 1959 L. E. THOMPSON 2,906,866

AUTOMATIC PHASE EQUALIZER

Filed Sept. 29, 1955 2 Sheets-Sheet 1

INVENTOR.
LELAND E. THOMPSON
BY F. A. Rechif
ATTORNEY

Sept. 29, 1959 L. E. THOMPSON 2,906,866

AUTOMATIC PHASE EQUALIZER

Filed Sept. 29, 1955 2 Sheets-Sheet 2

INVENTOR.
LELAND E. THOMPSON
BY
F. A. Rechif
ATTORNEY

United States Patent Office 2,906,866
Patented Sept. 29, 1959

2,906,866

AUTOMATIC PHASE EQUALIZER

Leland E. Thompson, Merchantville, N.J., assignor to Radio Corporation of America, a corporation of Delaware Application September 29, 1955, Serial No. 537,392
7 Claims. (Cl. 250—6)

This invention relates to an automatic phase equalizer, and more particularly to a phase equalizer particularly useful in frequency modulation (FM) relaying systems.

In FM relaying systems transmitting color television signals or a large number of frequency division multiplexed telephone signals, the system phase response should be linear with frequency over the pass band. In other words, through the entire relaying system the signal phase shift should vary linearly with frequency, for no distortion of the signal; thus, while the different frequencies in the signal should be shifted a different amount in angle, each frequency should be delayed the same amount in time. The slope of the phase shift or phase response characteristic, commonly called the "group delay," is a measure of the linearity of the phase response, and ideally the group delay characteristic should be a straight horizontal line, when the group delay (in units of time) is plotted in a graph as the ordinate against frequency as the abscissa.

In relaying systems the selectivity in the repeater stations is quite often obtained by means of radio frequency (RF) bandpass filters operating in the microwave region, for example from 2000 mc. to 7000 mc. This would be the case where travelling wave tubes are used for amplification at the RF. Most of the group delay of the system will then be due to these RF filters, and in a system with many repeaters the group delay adds up with the number of RF bandpass filters. In order to minimize the group delay variation, one or more phase compensating or phase equalizing circuits are commonly used in the intermediate frequency (IF) portion of the terminal receiver, these phase equalizing circuits having a group delay curve that is substantially the inverse of that of the RF filters of the relaying system. The IF portion of the terminal receiver may have a center frequency that is in the range of 30 mc. to 90 mc. As an example, the IF portion may be operating at 60 mc., whereas the RF portion may be operating at 6000 mc. Under ideal conditions, the equalization provided by the phase equalizers is so complete that the overall system phase response is linear with frequency over the pass band. However, a change in ambient temperature, for example, may change the characteristics of the RF bandpass filters so that the center of the group delay curve of the relaying system (which relaying system group delay is governed by the RF bandpass filters) changes or shifts relative to the center of the group delay curve of the phase equalizing circuits. The result in this case is that the equalization is no longer complete, so that the resulting overall system group delay characteristic may still be a straight line, but is no longer horizontal or invariant with frequency. Then, the overall system phase response is no longer linear with frequency, and this condition is undesirable, since it introduces distortion.

An object of this invention is to provide a novel phase equalizing arrangement for microwave relaying systems.

Another object is to devise an arrangement which operates automatically to maintain phase equalization during periods of ambient temperature change, etc. in a microwave relaying system.

A further object is to devise a phase equalizing arrangement wherein the center of the group delay curve of the equalizing circuits is automatically maintained aligned with the center of the group delay curve of the relaying system, even though the latter curve tends to shift.

The objects of this invention are accomplished, briefly, in the following manner: At the transmitter, a subcarrier wave is transmitted along with the video or multiplex telephone signals. If a television system is involved, a horizontal synchronizing frequency will ordinarily be transmitted along with the subcarrier. If a multiplex telephone system is involved, then a pilot tone corresponding in frequency to the aforementioned synchronizing frequency, is transmitted along with the subcarrier. At the receiver, this subcarrier is separated out, demodulated, and amplified. If the overall system group delay variation is zero over the pass band, no modulation of this subcarrier wave by the horizontal synchronizing frequency of 15,750 c.p.s. will occur. However, if the residual group delay variation is not zero, the subcarrier wave will be phase modulated at a frequency of 15,750 c.p.s. This modulation frequency is selected from the subcarrier demodulator output and the sense of it is determined by comparison in a phase detector with the 15,750 c.p.s. component of the video or multiplex telephone signal. The positive or negative D.C. output of the phase detector is used to vary the frequency of the local heterodyne oscillator, to vary the center of the group delay curve of the phase equalizer so as to bring the latter into alignment or coincidence with the center of the group delay curve of the relaying system.

A detailed description of the invention follows, taken in conjunction with the accompanying drawings, wherein.

Figure 1:
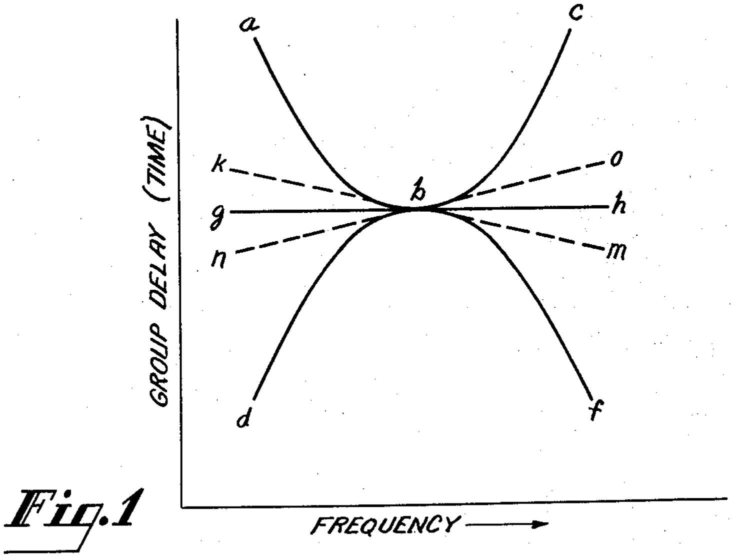
Fig. 1 is a set of curves useful in explaining the invention.

In a relaying system with many repeaters, the group delay adds up with the number of RF bandpass filters utilized. The group delay curve, for bandpass filters as ordinarily utilized, is parabolic in shape, over the pass band of the system, as illustrated in Fig. 1 by curve *a, b, c*. So-called "all pass" circuits are commonly used in the IF amplifier portion of the terminal receiver to minimize the group delay variation, that is, to flatten the curve, *a, b, c* out into a straight, horizontal line, which would indicate an equal time delay for all frequencies in the pass band. In this connection, it should be pointed out that the overall group delay is equal to the group delay of the RF bandpass filters plus the group delay of the "phase equalizer" circuits in the IF portion, since these various circuits are all in cascade insofar as the signal is concerned.

The group delay curve for the "all pass" circuits used as "phase equalizers" is also parabolic in shape, as illustrated by curve *d, b, f*, but substantially the inverse of curve *a, b, c*. The overall or resulting group delay curve (sum of curves *a, b, c* and *d, b, f*) is illustrated by the straight, horizontal line *g, b, h*. Since this line is straight and horizontal over the pass band of the system, the variation of the resulting group delay is zero over the pass band of the system.

To repeat, the curve *a, b, c* in Fig. 1 represents the group delay of the RF filters in the repeating system and the curve *d, b, f* represents the group delay of the phase equalizing or compensating circuits in the IF portion of the terminal receiver. Although the centers of these two curves are shown as equal in frequency, this is actually not the case, since curve *a, b, c* may be centered at 6000 mc. and curve *d, b, f* at 60 mc. However, they are aligned in frequency when consideration is given to the conversion of the incoming signal from RF to IF, by the local heterodyne oscillator.

First, assume that the signal carrier is in the center of the RF filters, at point *b*. The usual receiver automatic frequency control would control the receiver local oscillator (which converts the received microwave signal to the IF range) so the signal carrier would be in the center of the IF phase equalizer circuits, at point *b*. In this case, the resultant group delay variation would be very low, in fact substantially zero variation, as represented by curve (actually, straight, horizontal line) *g, b, h*.

However, an ambient temperature change may change the characteristics of the RF bandpass filters so that the center of the RF group delay curve shifts to another point, equivalent to moving the curve *a, b, c* bodily to right, for example. The carrier does not change frequency, so the group delay curve of the RF bandpass filters now does not match the group delay curve of the phase equalizing or compensating circuits. In other words, the center of the group delay curve of the equalizing circuits is now not aligned with or coincident with the center of the group delay curve of the relaying system. The resulting group delay characteristic (sum of the curve *a, b, c* in its new position, shifted laterally in one direction or the other, and curve *d; b, f*) will now be a straight line similar to the dashed lines *k, b, m* or *n, b, o* in Fig. 1. These dashed lines are not horizontal, which means that the group delay is not constant over the pass band. This is an undesirable condition, since with the group delay variation not zero over the pass band, distortion is introduced. The present invention comprises a circuit arrangement which operates to automatically maintain the alignment or coincidence of the centers of the group delays of the system and of the equalizing or compensating circuits.

Figure 2:
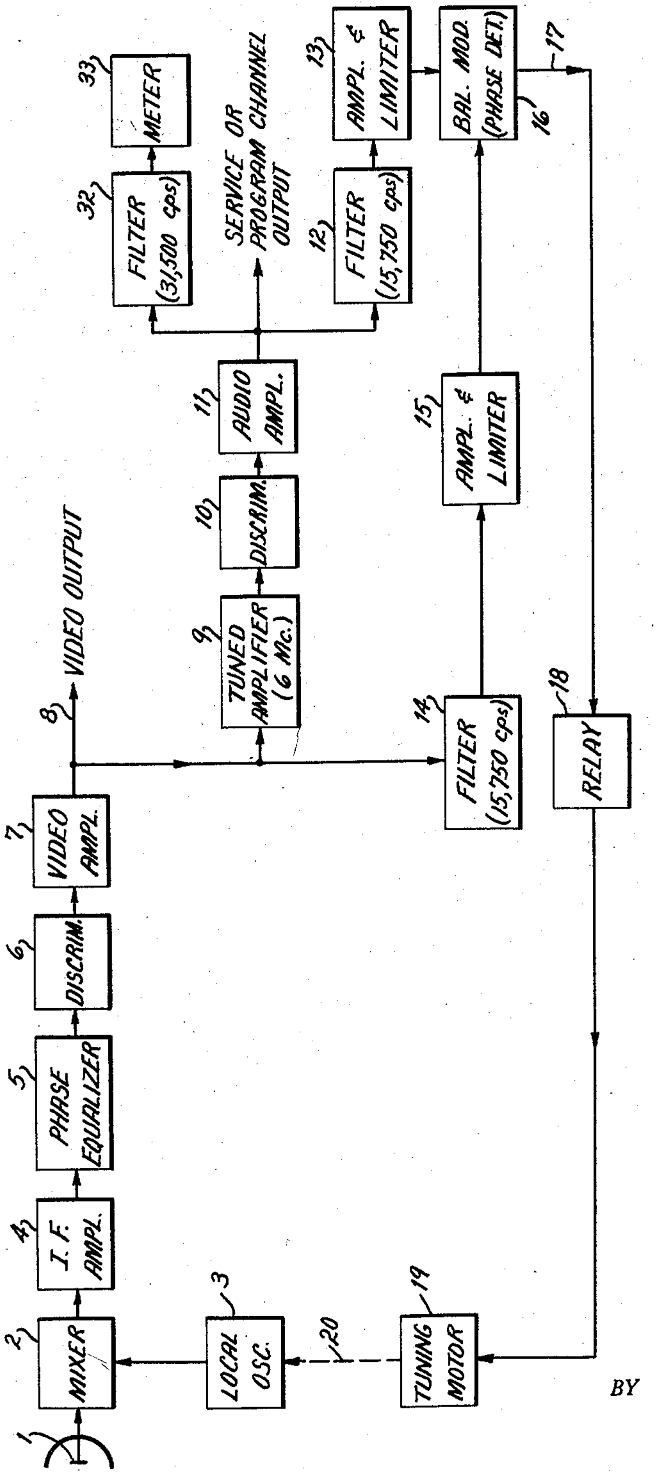
Fig. 2 is a block diagram of the arrangement at a terminal receiver according to this invention.

Fig. 2 is a block diagram of a terminal receiver station incorporating the automatic phase equalizer of the present invention. Referring to Fig. 2, a microwave receiving antenna 1 picks up the frequency modulated microwave signal from the proximate repeater station of the relaying system and feeds this signal as one of the inputs to a mixer 2 to the other input of which is fed, for heterodyning purposes, microwave energy from a local oscillator 3. The intelligence being relayed by the microwave relaying system may comprise television video signals, either color or monochrome, or multiplex telephone signals, plus a subcarrier (of 6 mc., for example) put on at the transmitter. In mixer 2, wave energy from antenna 1 beats with wave energy from oscillator 3 to produce an IF wave which is passed through an IF amplifier 4 to the input of a phase equalizer 5. This phase equalizer or phase compensator is in the IF portion of the terminal receiver illustrated and may be an "all pass" circuit, for example, having a group delay characteristic (such as represented by curve *d, b, f*) such as to substantially compensate the group delay characteristic *a, b, c* of the various RF bandpass filters in the relaying system, to thereby produce a resultant group delay variation of substantially zero over the pass band.

The frequency modulated output of the phase equalizer 5 goes to a discriminator 6 for demodulation and the demodulated output of unit 6 (which may be various video frequencies plus the 6 mc. subcarrier) is amplified in a video amplifier 7 the output of which is fed to any suitable utilization circuit by means of an output connection 8.

A portion of the output of video amplifier 7 is fed to the input of a tuned amplifier 9 which is tuned to select out and pass the subcarrier which is transmitted from the transmitting terminal of the relaying system along with the video signal or multiplex telephone signals. If the subcarrier has a frequency of 6 mc. amplifier 9 would be tuned to 6 mc. The subcarrier is selected by amplifier 9, demodulated by discriminator 10, and the modulation components, if any, are amplified in an audio amplifier 11.

When a television signal is being transmitted by means of FM, the largest video component, and hence the greatest frequency deviation of the carrier, is at the horizontal synchronizing frequency of 15,750 c.p.s. If the group delay compensation is exact and the group delay variation is zero (as in line *g, b, h* in Fig. 1), then all component frequencies are delayed the same amount of time in passing through the system, and the signal is not distorted. In other words, there is then no intermodulation of the different signal components. Thus, the subcarrier frequency of 6 mc. will not be modulated by the 15,750 c.p.s. horizontal synchronizing signal if the group delay variation is zero over the pass band of the system. If, however, some signal components are delayed a greater or less amount of time than others (residual group delay variation similar to lines *k, b, m* or *n, b, o* in Fig. 1), intermodulation will result. Then, the horizontal synchronizing signal (15,750 c.p.s.) will phase modulate the 6 mc. subcarrier wave, and thus the subcarrier wave will be phase modulated at a frequency of 15,750 c.p.s. This modulating frequency will then be derived in discriminator or demodulator 10 and will appear in the output of items 10 and 11. This frequency is selected by the filter 12 whose input is coupled to the output of amplifier 11, and is amplified and limited by the amplifier and limiter 13.

Another portion of the output of video amplifier 7 is fed directly to the input of a filter 14 which selects and passes the 15,750 c.p.s. component of the video signal passing through video amplifier 7. The output of filter 14 is amplified and limited by amplifier and limiter 15.

As has been previously stated, if the group delay variation is zero no intermodulation occurs, the subcarrier wave will not be modulated, and there will be zero signal in amplifier and limiter 13. If the group delay variation is not zero the subcarrier wave will be modulated by the 15,750 c.p.s. horizontal synchronizing signal, and there will be a 15,750 c.p.s. signal in amplifier and limiter 13. The 15,750 cycle signal from 13 and that from 15 will be either in phase or 180 degrees out of phase, depending on whether the residual group delay variation has a slope such as *k, b, m* or *n, b, o* in Fig. 1, that is, depending on or proportional to the sense of the non-alignment or non-coincidence of the centers of the group delay curves *a, b, c* and *d, b, f*, or on the sense of the modulation of the subcarrier by the horizontal sync signal component. The output of both amplifiers 13 and 15 are connected to the two respective inputs of the balanced modulator or phase detector 16, which has two input connections and an output connection 17. The output of 16, if not zero, is either a positive D.C. voltage or a negative D.C. voltage, depending on whether the output of 13 is in phase of 180 degrees out of phase with the output of 15. The D.C. voltage output of phase detector 16 appears at its output connection 17. The amplitude of this voltage output is proportional to the degree of non-alignment or non-coincidence of the centers of the group delay curves *a, b, c* and *d, b, f*, or to the degree of modulation of the subcarrier by the horizontal sync signal component.

The D.C. voltage output of detector 16 is used to operate the polar relay 18, which controls the oscillator tuning motor 19. The motor 19, by means of a mechanical connection indicated at 20, varies the frequency of the local heterodyne oscillator 3. The received carrier, changed by the mixer 2 and local oscillator 3 to the IF, can be moved to any part of the IF pass band by changing the local oscillator frequency. Thus, as the frequency of the local oscillator 3 is varied, the center of the group delay variation of the phase equalizer 5 varies relative to the center of the group delay variation of the system. This is equivalent to moving the curve *d*, *b*, *f* in Fig. 1 bodily to one side or the other. The position of the carrier in the RF pass band is not affected by the local oscillator frequency.

If properly phased, the tuning motor 19 will maintain the frequency of the local oscillator 3 at such a frequency that the residual group delay variation will not depart substantially from zero over the signal band of frequencies. This is so because the D.C. output of phase detector 16 is responsive to a non-zero condition of the resulting group delay variation, and this D.C. output is used to vary the frequency of local oscillator 3, to thereby vary the center of the group delay variation of the phase equalizer 5 relative to the center of the group delay variation of the system. The phase relations are such that the center of the group delay curve of the equalizer 5 is automatically maintained aligned with or coincident with the center of the group delay curve of the relaying system, even though the latter tends to shift as a result of ambient temperature changes or other causes.

The 6 mc. subcarrier may be a separate modulating signal put on at the transmitter, or it may be the subcarrier which is sometimes used as an audio channel for either service or program signals. The latter is indicated by the legend "Service or Program Channel Output," coupled to the output of audio amplifier 11.

When frequency division multiplex telephone signals are being relayed instead of television signals, it will be necessary to add a 15,750 c.p.s. modulating tone at the transmitter, since the system of this invention as disclosed depends upon the presence of this frequency component for automatic phase equilization.

Figure 3:
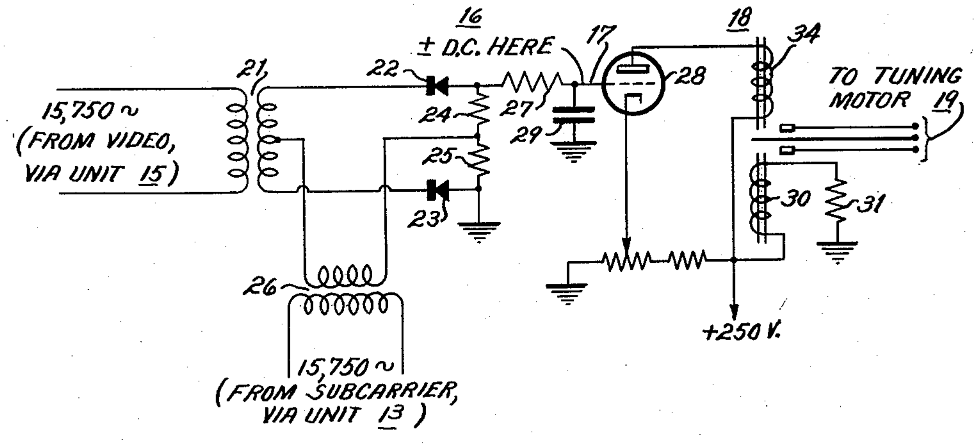
Fig. 3 is a detailed schematic of a portion of Fig. 2.

Fig. 3 shows details of the balanced modulator 16 and relay 18. The output of amplifier and limiter 15 is applied to the primary winding of a transformer 21 having a centertapped secondary winding. A diode detector 22 has one electrode connected to one end of the secondary winding, and another diode detector 23 is connected between the other end of the secondary winding and ground. Two resistors 24 and 25 are connected in series between the other electrode of diode 22 and ground. The output of amplifier and limiter 13 is applied to the primary winding of a transformer 26. One end of the secondary winding of transformer 26 is connected to the center tap on the secondary winding of transformer 21, while the other end of this secondary winding is connected to the common junction of resistors 24 and 25. The common junction of diode 22 and resistor 24 is connected through a resistor 27 which constitutes part of a resistance-capacitance time constant or filtering network, to output lead 17 which is connected to the grid of a relay amplifier tube 28. A capacitor 29 is connected from lead 17 to ground, to complete the time constant network referred to. The anode of tube 28 is connected through one winding 34 of a polarized relay 18 to the positive terminal of a unidirectional potential source, while the other winding 30 of this relay is connected in series with a resistor 31, between the positive terminal of the unidirectional potential source and ground. The cathode of tube 28 is biased positively by connecting the same to a point on a voltage divider connected between the positive terminal of the unidirectional potential source and ground.

If the 15,750 cycle tone from the demodulated subcarrier is zero (indicative of a resulting group delay variation of zero over the pass band), the D.C. output of the phase detector 16 will be zero and the tuning motor 19 will not be energized. A positive or negative D.C. voltage is obtained from the phase detector 16, with a 15,750 cycle phase detector input from the demodulated subcarrier which is either in phase or 180 degrees out of phase with the 15,750 cycle tone from the video signal. In response to this positive or negative D.C. voltage output, the contacts of relay 18 are operated to energize the tuning motor 19 in the proper direction of rotation to maintain the phase equalization, by variation of the frequency of local oscillator 3.

The resistor 27 and capacitor 29 are chosen to have the proper time constant so that together with the speed of the tuning motor 19 a stable control system (actually a type of servo system) will result.

A filter 32, designed to pass waves of 31,500 c.p.s. frequency, is receptive of a portion of the output of amplifier 11, and the output of filter 32 is fed to a meter 33. Items 32 and 33 are not part of the automatic control system, but are used only during tests of the system. To test the system, a 15,750 c.p.s. sine wave tone is applied to the transmitter of the relaying system, as well as the 6 mc. subcarrier. If the group delay curve of the phase equalizer 5 does not match the parabolic group delay curve of the RF portions of the relaying system, there will be a residual parabolic group delay. Although a linear group delay "curve" produces a 15,750 cycle phase modulation of the subcarrier, as previously described, if the residual group delay is parabolic in shape the 6 mc. subcarrier will be phase modulated at double the frequency of the horizontal sync, that is, at 31,500 c.p.s. The filter 32, which passes this 31,500 cycle modulation, and the meter 33 are therefore used to indicate the amount of residual parabolic group delay which is present. The amount of this residual parabolic group delay is minimized by an adjustment of the phase equalizer 5, so that the residual group delay is substantially only linear, as typified by lines *g*, *b*, *h* or *k*, *b*, *m* or *n*, *b*, *o*, preferably the first one of these (*g*, *b*, *h*), which represents the optimum condition of zero group delay variation over the pass band.

What is claimed is:

1. In a wide frequency band communications system wherein the intelligence transmitted as modulation from the transmitter includes a subcarrier wave of predetermined frequency and a modulating signal component of a frequency lower than the subcarrier frequency, a receiving station comprising a local oscillator, means for mixing the incoming received signal with a heterodyning signal from said local oscillator to produce an altered frequency signal, a phase equalizer in the altered frequency signal path, said equalizer having a delay characteristic over said wide frequency band which is substantially the inverse of the delay characteristic of one or more components of the communications system over the same wide band, variations in system delay of the receiving station output signal resulting in modulation of said subcarrier wave by said lower frequency signal component, means for detecting said modulated subcarrier wave to derive therefrom said signal component, a phase detector for comparing said signal component derived from said detecting means with said signal component derived from the detected modulating signal output of said receiving station to produce a voltage proportional to the degree and sense of modulation of the subcarrier wave, and means for utilizing said voltage to vary the frequency of said local oscillator in a sense to reduce the modulation of the subcarrier wave.

2. In a wide band communications system wherein the intelligence transmitted as modulation from the transmitter includes a subcarrier wave of predetermined frequency and a modulating signal component of a frequency lower than the subcarrier frequency, a receiving station comprising a local heterodyne oscillator for heterodyning the incoming received signal to an altered frequency signal, means for demodulating the altered frequency signal to produce the modulation frequencies, variations in system group delay of the demodulating means output signal resulting in modulation of said subcarrier wave by said lower frequency signal component, means tuned to said predetermined frequency for selecting from the demodulating means output said subcarrier wave, demodulating means coupled to said last-named means for detecting said last-mentioned modulation, a phase detector for comparing said signal component derived from said last-named demodulating means with said signal component derived from said first-named demodulating means to produce a voltage proportional to the degree and sense of modulation of the subcarrier wave, and means for utilizing said voltage to vary the frequency of said local oscillator in a sense to reduce the modulation of the subcarrier wave.

3. In a wide band communications system wherein the intelligence transmitted as modulation from the transmitter includes a subcarrier wave of predetermined frequency and a modulating signal component of a frequency lower than the subcarrier ferquency, a receiving station comprising a local oscillator, means for mixing the incoming received signal with a heterodyning signal from said local oscillator to produce an altered frequency signal, a phase equalizer in the altered frequency signal path, said equalizer having a group delay characteristic which is substantially the inverse of the group delay charactertistic of one or more components of the communications system, means for demodulating the altered frequency signal to produce the modulation frequencies, variations in system group delay of the demodulating means output signal resulting in modulation of said subcarrier wave by said lower frequency signal component, means tuned to said predetermined frequency for selecting from the demodulating means output said subcarrier wave, demodulating means coupled to said last-named means for detecting said last-mentioned modulation, a phase detector for comparing said signal component derived from said last-named demodulating means with said signal component derived from said first-named demodulating means to produce a voltage proportional to the degree and sense of modulation of the subcarrier wave, and means for utilizing said voltage to vary the frequency of said local oscillator in a sense to reduce the modulation of the subcarrier wave.

4. In a wide band communications system wherein the intelligence transmitted as modulation from the transmitter includes a subcarrier wave of predetermined frequency and a modulating signal component of a frequency lower than the subcarrier frequency, a receiving station comprising a local oscillator, means for mixing the incoming received signal with a heterodyning signal from said local oscillator to produce an intermediate frequency signal, a first demodulator coupled to the output of said mixing means, an amplifier tuned to pass said predetermined frequency coupled to the output of said demodulator, a second demodulator coupled to the output of said amplifier, a first filter tuned to pass said modulating signal component coupled to the output of said second demodulator, a second filter tuned to pass said modulating signal component coupled to the output of said first demodulator, a phase detector having two inputs and an output, means coupling the output of said first filter to one of said phase detector inputs, means coupling the output of said second filter to the other of said phase detector inputs, and means coupled to said phase detector output for controlling the frequency of said local oscillator.

5. In a frequency modulation relaying system for wide band signals wherein the intelligence transmitted as frequency modulation from the transmitter includes a subcarrier wave of predetermined frequency and a modulating signal component of a frequency lower than the subcarrier frequency, a receiving station comprising a local oscillator, means for mixing the incoming received frequency modulated signal with a heterodyning signal from said local oscillator to produce an intermediate frequency signal, a first discriminator coupled to the output of said mixing means, an amplifier tuned to pass said predetermined frequency coupled to the output of said discriminator, a second discriminator coupled to the output of said amplifier, a first filter tuned to pass said modulating signal component coupled to the output of said second discriminator, a second filter tuned to pass said modulating signal component coupled to the output of said first discriminator, a phase detector having two inputs and an output, means coupling the output of said first filter to one of said phase detector inputs, means coupling the output of said second filter to the other of said phase detector inputs, and means coupled to said phase detector output for controlling the frequency of said local oscillator.

6. In a wide band communications system wherein the intelligence transmitted as modulation from the transmitter includes a subcarrier wave of predetermined frequency and a modulating signal component of a frequency lower than the subcarrier frequency, a receiving station comprising a local oscillator, means for mixing the incoming received signal with a heterodyning signal from said local oscillator to produce an intermediate frequency signal, a fixed phase equalizer in the intermediate frequency signal path, a first demodulator coupled to the output of said equalizer, an amplifier tuned to pass said predetermined frequency coupled to the output of said demodulator, a second demodulator coupled to the output of said amplifier, a first filter tuned to pass said modulating signal component coupled to the output of said second demodulator, a second filter tuned to pass said modulating signal component coupled to the output of said first demodulator, a phase detector having two inputs and an output, means coupling the output of said first filter to one of said phase detector inputs, means coupling the output of said second filter to the other of said phase detector inputs, and means coupled to said phase detector output for controlling the frequency of said local oscillator.

7. In a wide band communications system wherein the intelligence transmitted as modulation from the transmitter includes a subcarrier wave of predetermined frequency and a modulating signal component of a frequency lower than the subcarrier frequency: a receiving station comprising a local oscillator, means for mixing the incoming received radio signal with a heterodyning signal from said local oscillator to produce an altered frequency signal, a phase equalizer in the altered frequency signal path, the component values in said equalizer being chosen so that the same has a group delay versus frequency characteristic which is substantially the inverse of the group delay versus frequency characteristic of one or more components of the communications system, variations in system group delay with frequency of the receiving station output signal resulting in modulation of said subcarrier wave by said lower frequency signal component, detecting means operating on said modulated subcarrier wave to derive therefrom said signal component, a phase detector, means for applying said signal component derived from said detecting means to said phase detector, means for also applying said modulating signal component derived from the detected modulating signal output of said receiving station to said phase detector, thereby to produce a phase detector output voltage proportional to the degree and sense of modulation of the subcarrier wave, and means for utilizing said voltage to vary the frequency of said local oscillator in a sense to reduce the modulation of the subcarrier wave.

References Cited in the file of this patent

UNITED STATES PATENTS

| | | |
|---|---|---|
| 2,065,565 | Crosby | Dec. 29, 1936 |
| 2,123,716 | Crosby | July 12, 1938 |
| 2,335,180 | Goldsmith | Nov. 23, 1943 |
| 2,341,649 | Peterson | Feb. 15, 1944 |
| 2,504,663 | Dome | Apr. 18, 1950 |
| 2,677,049 | Rogers | Apr. 27, 1954 |
| 2,734,131 | Magnuski | Feb. 7, 1956 |
| 2,750,440 | Sziklai | June 12, 1956 |